US009047767B2

(12) United States Patent
Hampapur et al.

(10) Patent No.: US 9,047,767 B2
(45) Date of Patent: Jun. 2, 2015

(54) TRAFFIC IMPACT PREDICTION FOR MULTIPLE EVENT PLANNING

(71) Applicant: International Business Machines Corporation, Armonk, NY (US)

(72) Inventors: Arun Hampapur, Norwalk, CT (US); Qing He, East Amherst, NY (US); Xuan Liu, Yorktown Heights, NY (US); Songhua Xing, Staten Island, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/020,987

(22) Filed: Sep. 9, 2013

(65) Prior Publication Data

US 2015/0073688 A1 Mar. 12, 2015

(51) Int. Cl.
*G06F 17/50* (2006.01)
*G08G 1/01* (2006.01)

(52) U.S. Cl.
CPC .................................... *G08G 1/0145* (2013.01)

(58) Field of Classification Search
USPC ......... 701/117, 118, 119, 120, 300, 408, 420, 701/423, 451; 340/906, 907, 910, 911, 915, 340/917, 991, 988
See application file for complete search history.

(56) References Cited

U.S. PATENT DOCUMENTS 3,731,271 A 5/1973 Muramatu et al.
6,427,113 B1 * 7/2002 Rahman ........................ 701/117
6,633,238 B2 * 10/2003 Lemelson et al. ............ 340/909
8,040,254 B2 10/2011 Delia et al.
2003/0210156 A1 * 11/2003 Nishimura .................... 340/907

OTHER PUBLICATIONS

Behrisch et al., “Event traffic forecast for metropolitan areas based on microscopic simulation,” In proceeding of: Third International Symposium of Transport Simulation 2008 (ISTS08), 2008, 10 pages.
Brown et al., Development of a Strategic Hurricane Evacuation-Dynamic Traffic Assignment Model for the Houston, Texas, Region, Transportation Research Record: Journal of the Transportation Research Board, vol. 2137, 2009, pp. 46-53.
Chung, Y. PhD Dissertation, “Development of spatio-temporal accident impact estimation model for freeway accident management,” University of California, Irvine, 2007, 299 pages.

(Continued)

*Primary Examiner* — Richard Camby
(74) *Attorney, Agent, or Firm* — Cantor Colburn LLP; Janice Kwon

(57) ABSTRACT

Embodiments relate to traffic impact prediction in a transportation network. Link level background traffic demand in a transportation network may be estimated based on information about available routes, and based on expected background traffic volumes between origins and destinations. A background traffic flow model that optimizes a background flow of the expected background traffic volumes among the available routes to minimize a sum of background congestion costs, background path entropy, and errors between an observed background traffic flow and the optimized background flow may be applied. Alternative routes may be identified based on the available routes and event based control plans. Expected additional event based traffic volumes may be received. A link level total traffic demand in the transportation network may be estimated based on the expected additional event based traffic volumes, the identified alternative routes, and the estimated background traffic demand.

15 Claims, 5 Drawing Sheets

(56) References Cited

OTHER PUBLICATIONS

Lassacher S. et al. "Traffic Management of Special Events in Small Communities" Transportation Research Record: Journal of the Transportation Research Board, vol. 2099, 2009, pp. 85-93.
Latoski et al. "Managing travel for planned special events" (Publication FHWA-OP-04-010).Washington, DC: U.S. Department of Transportation, Federal Highway Administration, Sep. 2003, 448 pages.
Sheu et al., "Stochastic modeling and real-tim prediction of incidient effects on surface street traffic congestion," Applied Mathematical Modelling 28, (2004), pp. 445-468.
Wojtowicz J., "Traffic Management for Planned Special Events Using Traffic Microsimulation Modeling and Tabletop Exercises," Journal of Transportation Safety & Security, 2:102-121, 2010, 20 pages.

* cited by examiner

TRAFFIC IMPACT PREDICTION FOR MULTIPLE EVENT PLANNING

BACKGROUND

The present invention relates generally to event planning, and more specifically to traffic impact prediction for multiple event planning.

Large scale planned events, such as sporting events and parades, attract high volumes of both pedestrians and vehicles (e.g., buses, passenger vehicles), often resulting in significant non-recurrent congestion on local transportation networks in the vicinity of the events. The local transportation networks, including the roadways used to travel to the events, are often overloaded by the additional demand as attendees simultaneously attempt to enter or exit the event. Traditionally, planning for the management of this congestion has been performed manually by individuals, such as traffic control managers, who use their past experiences to determine how to deploy traffic control agency resources in an effort to minimize bottlenecks.

Unplanned events, such as traffic incidents, severe weather, and facility problems, may also cause significant non-recurrent congestion to roadways. Non-recurrent congestion caused by unplanned events is often due to a restriction in capacity because of damaged or disabled traffic lanes or other disabled roadway infrastructures. Similar to planned events, the management of congestion caused by unplanned events is performed manually by individuals based on their past experiences.

SUMMARY

Embodiments include a method, system, and computer program product for traffic impact prediction. A method may include estimating a link level background traffic demand in a transportation network. The estimating may include: receiving information about available routes in the transportation network; receiving expected background traffic volumes between origins and destinations in the transportation network; and applying a background traffic flow model that optimizes a background flow of the expected background traffic volumes among the available routes to minimize a sum of background congestion costs, background path entropy, and errors between an observed background traffic flow and the optimized background flow. Alternative routes may be identified for at least a subset of the estimated link level background traffic demand, the identifying based on the available routes in the transportation network and event based control plans. Expected additional event based traffic volumes between the origins and the destinations in the transportation network may be received. A link level total traffic demand in the transportation network may be estimated based on the expected additional event based traffic volumes, the identified alternative routes, and the estimated background traffic demand. The estimated link level total traffic demand may be output.

Additional features and advantages are realized through the techniques of embodiments of the present invention. Other embodiments and aspects of embodiments of the invention are described in detail herein. For a better understanding of embodiments of the present invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of embodiments of the invention are apparent from the following detailed description taken in conjunction with the accompanying drawings in which:

DETAILED DESCRIPTION

Figure 1:
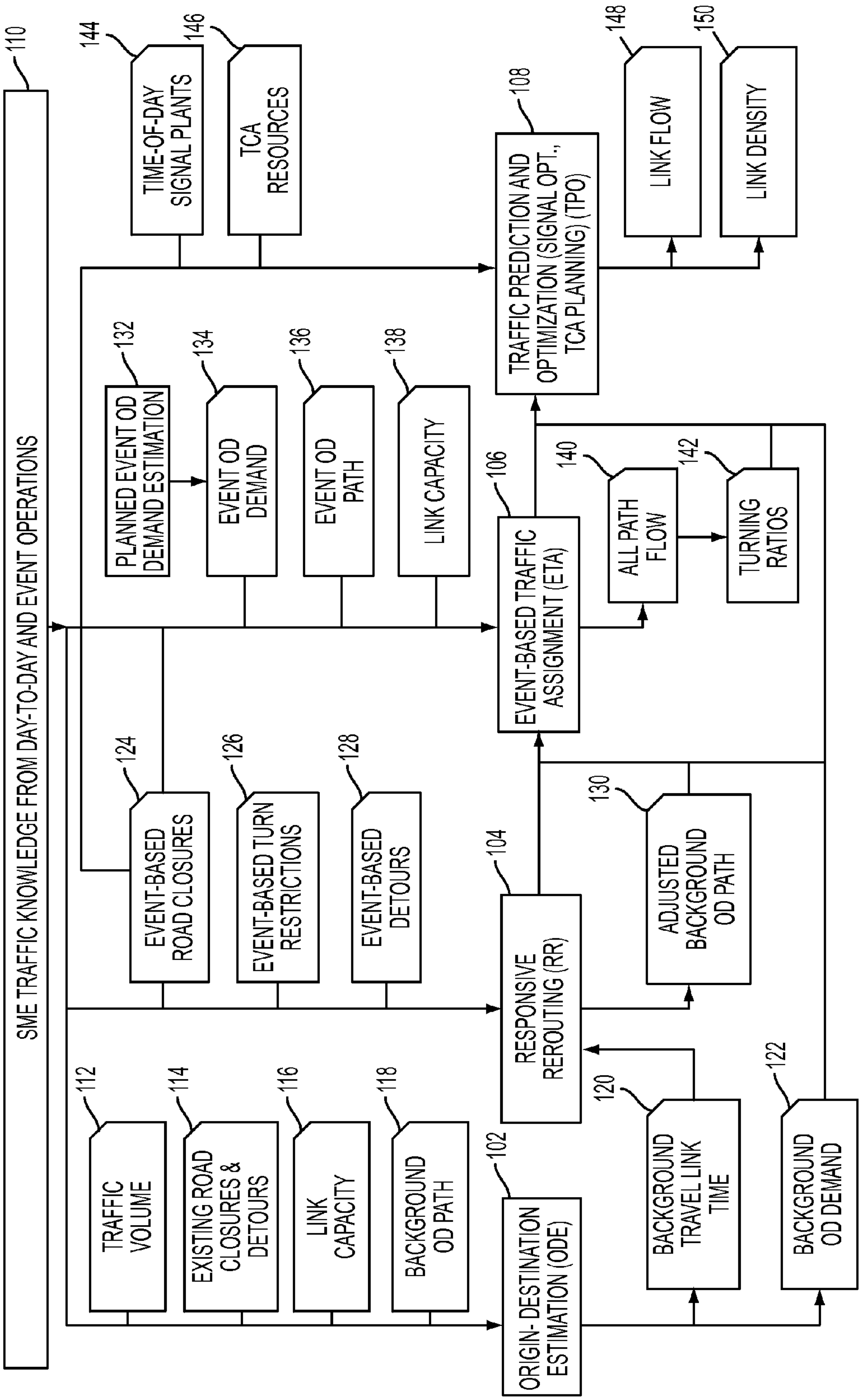
FIG. 1 depicts a framework for special event planning that may be implemented by an embodiment.

Exemplary embodiments are directed to traffic impact prediction for multiple event planning. An embodiment includes a traffic prediction framework model that may be used to address traffic planning for large scale events. In addition, the model may be applied to any traffic networks, and it is scalable to region wide traffic planning. Historical human experiences (e.g., subject matter expert or "SME" knowledge) may also be taken into account by the model to reduce gaps between transportation theory and reality. For planned events, by assuming reasonable event arrival and departure temporal distributions, embodiments of the model can be used to estimate spatial-temporal event origin-destination demand. As used herein, the term "spatial-temporal event origin-destination demand" refers to the number of trips that are generated from origins (e.g., homes) to destinations (e.g., event parking lots) at particular time intervals. An embodiment of the traffic prediction framework model may also be used to suggest alternative routes for normal day-to-day traffic that is impacted or influenced by the events. When suggesting alternative routes the model may make the assumption that most people are not aware of an event until they receive real-time traveler information about the event (e.g., signs, detour instructions).

Large scale special planned events (e.g., sporting events and parades) often attract high volumes of pedestrians and vehicles. These high volumes may include significant non-recurrent congestion as well as queue spillover (e.g., traffic backed up over several blocks, gridlock). As used herein, the term "non-recurrent congestion" refers to traffic congestion caused by the occurrence of an event, with characteristics of the non-recurrent congestion related to the event. This is contrasted to background traffic or time-of-day traffic that is recurrent congestion in that it occurs on a regular basis (daily, weekly). Embodiments described herein can be used to predict a traffic impact of the non-recurrent congestion that occurs due to the occurrence of planned events.

The use of statistical models (e.g., predict traffic impact using a statistical model), routine based manual event traffic planning (e.g., predict traffic impact based on historical experience only), traffic assignment models (e.g., predict traffic impact by assuming that a traffic state will converge to an equilibrium state and that travelers have perfect travel information), and microscopic simulation models (e.g., predict traffic impact by detailed traffic simulation software) are generally not adequate for multiple event traffic prediction. Drawbacks to the use of statistical models may include that they require a lot of training data to be able to build a statistical model and often it is difficult to obtain sufficient event training data. Routine based manual event planning typically cannot adaptively adjust for a large variety of event scenarios and circumstances. Traffic assignment models may suffer from being inaccurate because they don't consider traveler rerouting since most people are not aware of an event until they notice signs or receive real-time traveler information in-route. In addition, queue dynamics cannot be generated from traffic assignment models. The use of microscopic simulation models suffers from drawbacks related to how much time and how much detailed data are required to build a model. Some drawbacks that may be common to all of the previously mentioned approaches include: not taking human experiences into account in the models; not considering a reasonable planned event arrival and departure temporal distribution to better estimate spatial-temporal demand; and assuming that people can react to events proactively even before they start a trip because they have perfect information about event locations and times.

Embodiments of a traffic prediction framework model described herein may be transportation network modeling based (e.g., using transportation network connectivity and queue dynamics to model traffic flows) and therefore, no large sets of training data are required. In addition, queue dynamics may be generated by store-and-forward traffic modeling (SFM). An embodiment uses a macroscopic model that may be executed in less time and with less information than that required by contemporary models. The traffic prediction framework model described herein may also include an analytical model that is adaptive to different multiple event scenarios (e.g., two events start and/or end within the same time period, or two events overlap in time but have different start and/or end times). Embodiments may allow the model to be adjusted based on historical learned human experience from, for example, traffic control agents (TCAs) or other SMEs. Embodiments may also allow for estimation of spatial-temporal demand from planned events (e.g., likely parking lots and arrival/departure times). In addition, the traffic prediction framework model may include a responsive rerouting model that makes suggestions on how to provide information to travelers that are in-route earlier so that they can avoid the increased traffic. The responsive routing model may also assume that most people are not aware of an event until they notice signs on the street after they have begun their trip.

As used herein, the term "transportation network" refers to a set of roadways. As used herein, the term "link" refers to a segment of a roadway between intersections. As used herein, the term "queue" refers to the number of vehicles waiting for a light or other traffic device.

Referring now to FIG. 1, a framework for special event planning that may be implemented by an embodiment is generally shown. In an embodiment, all or a portion of the framework may be implemented by a software application executing on a computer processor. The origin-destination estimation (ODE) block 102 can receive information about traffic volume 112, existing road closures and detours 114, link capacity 116, and background origin-destination (OD) paths 118 (e.g., paths taken by traffic that travels the OD path on a typical day, does not take into account additional traffic caused by an event) for roadways within a roadway network of interest. In addition, subject matter expert (SME) knowledge from day-to-day event operations 110 can be input to the ODE block 102. The ODE block 102 can generate background link travel time data 120 (e.g., travel time on a segment of street) and background OD demand data 122 (e.g., number of trips from an origin to a destination). The background OD demand data 122 generated by the ODE block 102 describes how many trips will be generated from origins to destinations at a particular time(s) and along particular links (i.e., it includes link level background traffic demand) without taking into account additional demand caused by an event.

An embodiment of a model of ODE used by the ODE block 102 to generate the background OD demand data 122 (e.g., how many trips are expected from origins to destinations and predicted routes) at a particular time uses the variables in Table 1 below.

TABLE 1

| | |
|---|---|
| $A$ | set of links |
| $A^o$ | set of links with observed traffic counts |
| $A^{SME}$ | set of links with SME knowledge from Field |
| $W$ | set of OD pairs |
| $K_{rs}$ | set of paths connecting OD pair $rs \in W$ |
| $x_a$ | flow on link a, $a \in A$ |
| $x_a^{obs}$ | observed flow from detectors on link a, $a \in A$ |
| $x_a^{SME}$ | observed flow from SME day-to-day knowledge on link a, $a \in A$ |
| $\tau_a$ | travel time on link a, $\tau_a = \tau_a(x_a)$ |
| $q_{rs}$ | demand for OD pair $rs \in W$ |
| $f_{rs}^k$ | flow on path $k \in K_{rs}$ |

Additional variables that may be used by the model of ODE may include: dw (integral with respect to w, which is traffic volume); $\theta$ (a coefficient); $f_k^{rs}$ (path flow from origin r to destination s, on kth path); $\phi$ a coefficient to adjust the weight for errors between calculated and observed knowledge by SME; $\gamma_0^-$ (a small positive fraction number); $\gamma_0^+$ (a small positive fraction number); and $\delta$ (link-path assignment coefficient, 0-1 binary, if a link a is on path k then it is equal to 1, otherwise it is equal to 0).

A formula that may be used by the model of ODE to generate the background OD demand data 122 at a particular time, where z is the objective function being minimized by the model follows:

$$z = \min_{(q,f)} \sum_{a \in A} \int_0^{x_a} \tau_a(w)dw + \frac{1}{\theta}\sum_r \sum_s \sum_k (f_k^{rs}(\ln f_k^{rs} - 1)) + \varphi \sum_{a \in A^{SME}} (x_a - x_a^{SME})^2$$

The first element of the above formula concentrates the trips on least cost paths, the second element has to do with path entropy (i.e., it spreads the trips across paths in the transportation network), and the third element minimizes the least square errors based on observed traffic counts. As used herein, the term "observed traffic counts" refers to historical observed traffic counts (e.g., traffic flow) either by detectors or by traffic operators or SMEs such as TCAs.

In an exemplary embodiment, the above objective, z, is subject to the following constraints. The following constraint ensures conservation between total path flow and demand between origins and destinations.

$$\sum_{k \in K_{rs}} f_{rs}^k = q_{rs} \ \forall \ rs \in W$$

The following are link flow constraints, to ensure that the link flow is close to the range of the observed link flow.

$$x_a^{obs}(1-\gamma_0^-) \le x_a \le x_a^{obs}(1+\gamma_0^+)\ \forall\ a \in A_o$$

The equations to map path flows to link flows follow.

$$\sum_r \sum_s \sum_k f_k^{rs} \delta_{rs}^{ka} = x_a\ \forall\ a \in A$$

The capacity constraints for each link follow.

$$\sum_r \sum_s \sum_k f_k^{rs} \delta_{rs}^{ka} \le C_a\ \forall\ a \in A_u$$

In all of the above formulas, q and f are assumed to be greater than or equal to zero.

In the embodiment of the ODE model shown above, a log it based stochastic user-equilibrium model is utilized. This model is based on the assumption that humans tend to choose a route so as to minimize travel time. Stochastic user-equilibrium as used in the above model assumes that travelers have no perfect information about transportation network conditions, so they choose a minimal cost path with a certain probability.

In an embodiment, the background link travel time 120 shown in FIG. 1 is derived using standard Bureau of Public Roads (BPR) functions. Given estimated link volumes, the BPR developed a link (arc) congestion (or volume-delay or link performance) function, which is referred to herein as "$S_a(v_a)$". $S_a(v_a)$ may be calculated as:

$$S_a(v_a) = t_a\left(1 + 0.15\left(\frac{v_a}{c_a}\right)^4\right)$$

where: $t_a$=free flow travel time on link a per unit of time; $v_a$=volume of traffic on link a per unit of time (or flow attempting to use link a), $c_a$=capacity of link a per unit of time, and $S_a(v_a)$ is the average travel time for a vehicle on link a.

As shown above, an embodiment of the ODE block 102 of FIG. 1, may apply a background traffic flow model that optimizes a background flow of the expected background traffic volumes among the available routes to minimize a sum of background congestion costs, background path entropy, and errors between an observed background traffic flow and the optimized background flow.

Referring back to FIG. 1, the responsive rerouting (RR) block 104 of FIG. 1 can receive information about event-based road closures 124, event-based turn restrictions 126 and event-based detours 128, as well as SME knowledge from day-to-day event operations 110 and outputs from the ODE block 102. The RR block 104 may use this information to generate an adjusted background OD path 130. Thus, given event-based control plans, such as variable message sign (VMS) locations, road closures, turning restrictions and detours, the RR block 104 can find possible alternative routes for typical time-of-day traffic. An embodiment of a model that may be implemented by the RR block 104 to generate the adjusted background OD path 130 is shown below in FIGS. 3 and 4.

The event-based traffic assignment (ETA) block 106 of FIG. 1 can receive information about planned event OD demand estimation 132 (e.g., an event OD trip matrix which describes how many trips will be generated from origins to destinations at a particular time(s) due to the event), event OD demand 134 (e.g., number of trips from an event origin to an event destination), event OD path 136, and link capacity 138, as well as SME knowledge from day-to-day event operations 110 and outputs from the RR block 104 block. An embodiment of an algorithm for generating the planned event OD demand estimation 132 is shown below in FIG. 2. The ETA block 106 can generate all path flow data 140 and turning ratio data 142. The all path flow data 140 (also referred to herin as the "total traffic demand") generated by the ETA block 106 describes how many trips will be generated from origins to destinations at a particular time(s) and along particular links (i.e., it includes link level total traffic demand) and it takes into account additional demand caused by an event.

Keeping the non-event impacted path flow unchanged, the ETA block 106 can re-assign event traffic and event influenced time-of-day background traffic which are estimated by event control plans. In an embodiment, the model used by the ETA block 106 also minimizes deviations from the background OD demand data 122. The ETA block 106 can then calculate and output turning ratio data 142 which describes expected paths at each intersection.

An embodiment of a model to perform event-based traffic assignment used by the event-based traffic assignment block 106 to re-assign event traffic and affected time-of-day traffic (e.g., as estimated by event control plans) while keeping the rest of the non-event path flow unchanged to generate the all path flow data 140 at a particular time is shown below. In addition, the model shown below calculates turning ratios at intersections. An embodiment of the model uses the variables shown in Table 2 below.

TABLE 2

| | |
|---|---|
| A | set of links |
| T | set of turns |
| $T^{SME}$ | set of turns with SME knowledge |
| W | set of OD pairs |
| $K_{rs}'$ | set of adjusted paths based on event control plans connecting OD pair rs ∈ W |
| $\delta_{rs}^{ka}$ | binary data if link a on path k of OD (r,s) |
| $x_a$ | flow on link a |
| $\tau_a$ | travel time on link a, $\tau_a = \tau_a(x_a)$ |
| $q_{rs}$ | demand for OD pair rs ∈ W |
| $f_{rs}^k$ | flow on path k ∈ $K_{rs}$ |
| $\xi_{ab}$ | turning ratios from link a to link b |
| $\xi_{ab}^{SME}$ | turning ratos with SME knowledge, from link a to link b |

A formula that may be used to generate the all path flow data 140 and turning ratio data 142, where z is the objective function being minimized by the model, follows:

$$z = \min_f \sum_{a\in A} \int_0^{x_a} \tau_a(w)dw + \frac{1}{\theta}\sum_r \sum_s \sum_k (f_k^{rs}(\ln f_k^{rs} - 1)) + \varphi \sum_{(a,b)\in T} (\xi_{ab} - \xi_{ab}^{SME})^2$$

The first element of the above formula concentrates the trips on least cost paths, the second element has to do with path entropy (i.e., it spreads the trips across paths in the transportation network), and the third element minimizes the least square errors from observed turning ratio counts. As used herein, the term "observed turning ratio counts" refers to the turning ratio is observed by turning movement detectors or traffic operators or SMEs.

In an exemplary embodiment, the above formula is subject to the following constraints.

In an exemplary embodiment, the above objective, z, is subject to the following constraints. The following constraint ensures conservation between total path flow, and demand between origins and destinations.

$$\sum_{k \in K_{rs}} f_{rs}^{k} = q_{rs} \ \forall \ rs \in W$$

The equations to map path flows to link flows follow.

$$\sum_{r}\sum_{s}\sum_{k} f_{k}^{rs}\delta_{rs}^{ka} = x_a \ \forall \ a \in A$$

The capacity constraints for each link follow.

$$\sum_{r}\sum_{s}\sum_{k} f_{k}^{rs}\delta_{rs}^{ka} \le C_a \ \forall \ a \in A_u$$

The constraints to ensure positive path flows follow.

$$f_{rs}^{k} \ge 0 \ \forall \ rs \in W, k \in K_{rs}$$

In an embodiment of the event-based traffic assignment model shown above, a log it based stochastic user-equilibrium model is utilized. This model is based on the assumption that humans tend to choose a route so as to minimize travel time. Stochastic user-equilibrium as used in the above model assumes that travelers have no perfect information about transportation network conditions, so they choose a minimal cost path with a certain probability.

As described above, an embodiment of the ETA block 106 of FIG. 1, can apply a total traffic demand model that optimizes a total flow of the expected background traffic volumes and the expected additional event based traffic volumes among the available routes and the identified alternative routes to minimize a sum of total congestion costs, total path entropy, and a deviation between observed turning ratios and estimated turning ratios. In addition, the total traffic demand model can further minimize a deviation from the optimized background flow.

The traffic prediction and optimization (TPO) block 108 of FIG. 1 may receive information about event-based road closures 124, time-of-day signal plans 144 (e.g., signal cycle settings) and TCA resources 146 (e.g., the number of TCAs available), as well as SME knowledge from day-to-day event operations 110 and outputs from the previous blocks. The TPO block 108 can generate link flow data 148 (e.g., traffic flow rate, number of vehicles per hour) and link density data 150 (e.g., number of vehicles per mile). Thus, the TPO block 108 can simulate traffic dynamics (also referred to herein as "traffic flow") given by the demand defined by a model generated by the previous blocks (e.g., the ODE block 102, the RR block 104, and the ETA block 106). In addition, the TPO block 108 can also perform signal plan optimization and TCA planning based on the simulated traffic dynamics.

Embodiments of the models described herein that are used for ODE block 102, RR block 104, and ETA block 106 can use SME (e.g., human) knowledge that is based on SME field experiences. For example, models for ODE block 102 and ETA block 106 may use day-to-day traffic operation data supplied by SMEs about arterial congestion and intersection (e.g., highway exit) congestion. The type of information supplied by SMEs to the model about arterial congestion may include, but is not limited to: street name, from cross street name, to cross street name, starting time, duration, congestion level, and queue description. The type of information supplied by SMEs to the model about intersection congestion may include, but is not limited to: street name, cross street name, starting time, duration, congestion level, and queue description. In addition, models for ODE block 102, RR block 104, and ETA block 106 may use event based traffic operation data supplied by SMEs. For example an input to a model to generate RR block 104 may include SME supplied information about responsive routes that includes, but is not limited to: alternative paths for read closures or congestion between a "from" node and a "to" node. In addition, an input to a model to generate ODE block 102 and ETA block 106 may include SME supplied information about turning ratios that includes, but is not limited to: intersection name, from street name, to street name, and traffic splits.

Figure 2:
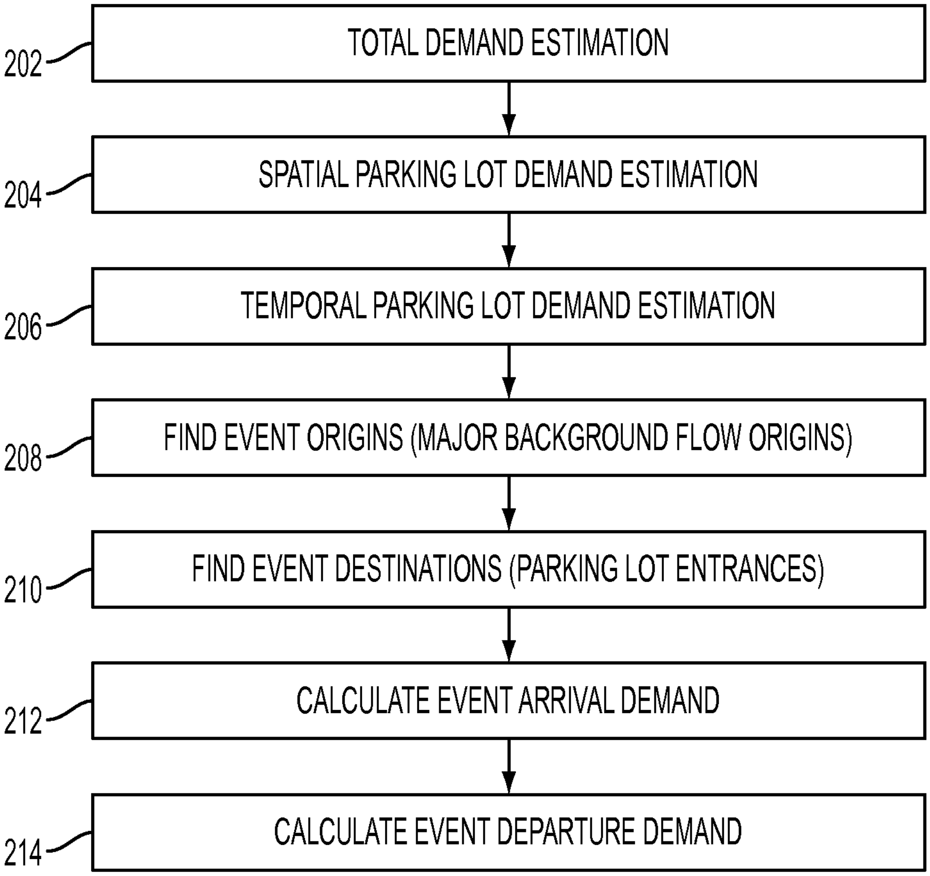
FIG. 2 depicts a flow diagram of a process for origin-destination estimation that may be implemented by an embodiment.

Turning now to FIG. 2, a flow diagram of a process for generating planned event OD demand estimation 132 in accordance with an embodiment is generally shown. At block 202, a total demand for an event is estimated. The total demand may be estimated by, for each event, i, calculating a total demand, De(i), where De(i)=the number of attendees divided by a car occupancy estimate. At block 204, spatial parking lot demand is estimated. This may include determining a capacity of all the parking lots within a selected estimated walk time (e.g., 10 minutes, 20 minutes) or selected estimated distance (e.g., 0.4 miles, 0.2 miles) of the event location to get parking lot capacity, Cp(j). The total demand, De(i) may then be assigned into each parking lot based on parking lot capacity, so that total parking lot demand, Dp(j), is equal to De(i)*(Cp(j)/sum(Cp(j))). Cp(j) refers to the capacity of the jth parking lot, and sum(Cp(j)) refers to capacity of all of the parking lots.

Temporal parking lot demand estimation may be calculated at block 206 by temporally splitting Dp(j) into each time stamp Dp(j,t) for arrivals and departures, respectively. A normal distribution may be used for arrivals, and an exponential distribution for departures. For example, if the event starts at time t1 and ends at time t2, then arrivals in the range t1−2, t1−1,t1,t1+1,t1+2 may be considered, along with departures in the range t2,t2+1,t2+2, where one step (+1, +2, −1, −2) is equal to one time segment (e.g., 15 minutes). At block 208, event origins may be determined, for example, by ranking background origins in descending order based on its demand Do(n,t) at time t. The top "N" origins are determined to be event origins. Block 208 locates the centroids of residential zones which are the origins people travel from. Those zones represent communities or areas that comply with the zip code of historical ticket sales records. At block 210, event destinations are determined. In an embodiment, event destinations include parking lot entrances.

Event arrival demand is calculated at block 212. At block 212, dynamic arrival demand may be calculated by spatially splitting Dp(j,t) into each origin to calculate event OD arrival demand, Dp(n,j,t), where Dp(n,j,t)=Dp(j,t)*Do(n,t)/sum(Do(n,t)), where t is in {t1−2,t1−1,t1,t1+1,t1+2}. Event departure demand is calculated at block 214. At block 214, dynamic departure demand may be calculated by spatially splitting Dp(j,t) into each origin to calculate event OD departure demand Dp(j,n,t)=Dp(j,t)*Do(n,t)/sum(Do(n,t)), where t is in {t2,t2+1,t2+2}.

Figure 3:
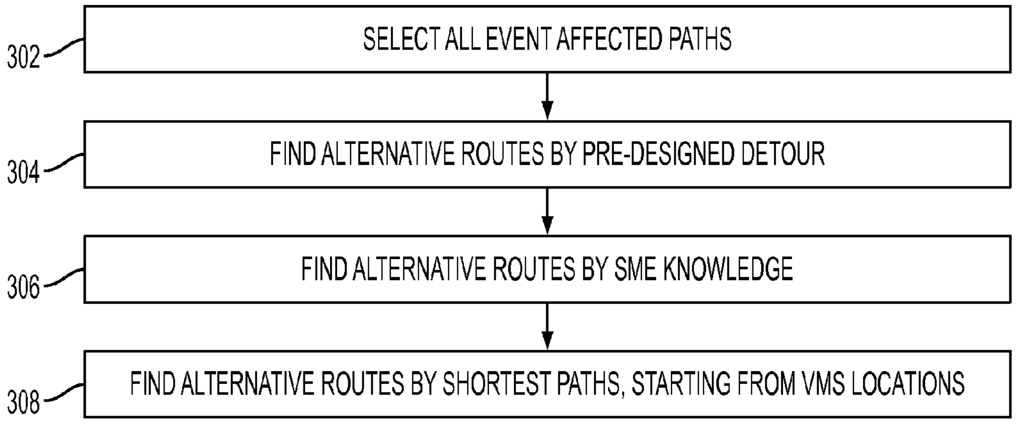
FIG. 3 depicts a flow diagram of a process for responsive rerouting that may be implemented by an embodiment.

Turning now to FIG. 3, a flow diagram of a process for performing responsive rerouting, such as that performed by the RR block 104 shown in FIG. 1, in accordance with an embodiment is generally shown. Inputs to the responsive rerouting may include event-based control plans such as, but not limited to: VMS locations, road closures (e.g., event-based road closures 124), turning restrictions (e.g., event-based turn restrictions 126), and detours (event-based detours 128). Output from the responsive rerouting includes possible alternative routes for time-of-day traffic. At block 302, all roadway paths affected by an event are selected. In an embodiment, the paths in the transportation network are categorized into paths that are affected by an event and paths that are not affected by an event. At block 304, alternative routes are identified using the detour data that was input, and at block 306, alternative routes are identified based on SME knowledge. At block 308, alternative routes are located based on their being the shortest paths starting from the VMS locations. Thus, in the process shown in FIG. 3 the methodology may include, for all affected paths, looking for time-dependent k-shortest path (where k is a user designated parameter to define how many shortest paths to output) using SME knowledge, starting from VMS locations to the destination.

Figure 4:
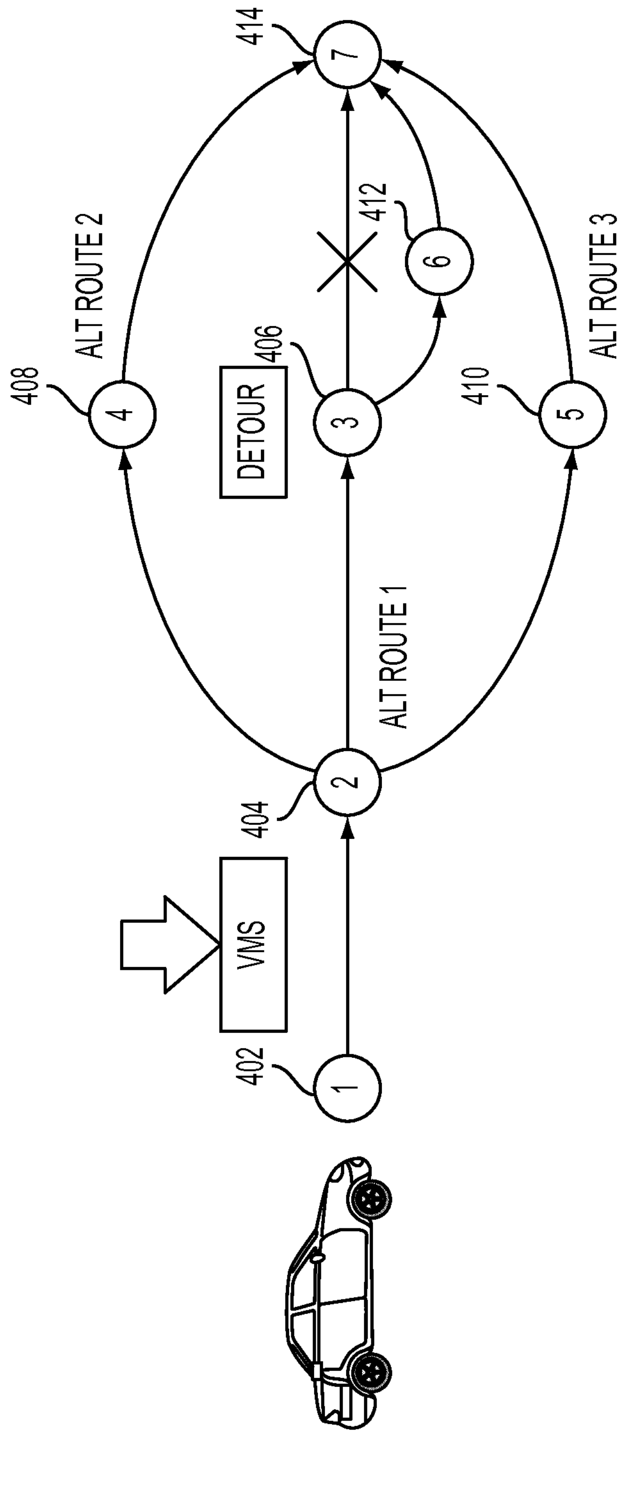
FIG. 4 depicts a block diagram of vehicle rerouting that may be implemented by an embodiment.

Referring now to FIG. 4, a block diagram of vehicle rerouting that may be implemented by an embodiment of the process shown n FIG. 3 is generally shown. As shown in FIG. 4, transportation network location one 402 is the origin and transportation network location seven 414 is the destination. As shown in FIG. 4, a VMS is located between transportation network location one 402 and transportation network location two 404 to alert the motorist that there is road closure ahead between transportation network location three 406 and transportation network location seven 414 (e.g., VMS specifies a road or location description). Once the motorist sees the VMS, the motorist is aware of the road closure and can start to make a decision about an alternative route. A first alternative route may include following the detour and driving from transportation network location two 404 to transportation network location three 406, to transportation network location six 412 and then to the destination transportation network location seven 414. A second alternative route may include an alternative route captured based on SME knowledge, and include driving from transportation network location two 404 to transportation network location four 408 to the destination at transportation network location seven 414. A third alternative route may include another alternative route captured based on SME knowledge, and include driving from transportation network location two 404 to transportation network location five 410 to the destination at transportation network location seven 414. These alternative routes may be included in the adjusted background OD path 130 shown in FIG. 1.

Figure 5:
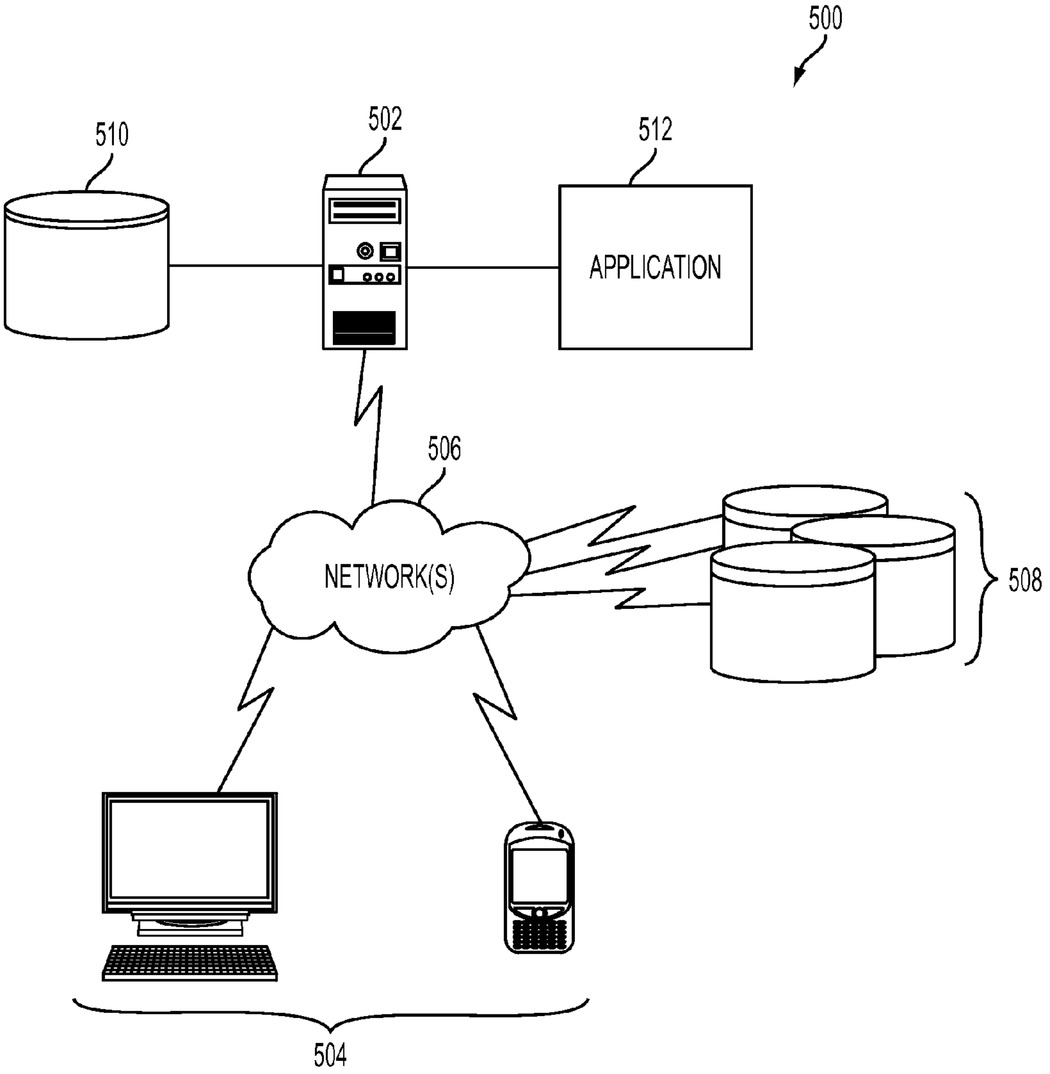
FIG. 5 depicts a system upon which traffic impact prediction for multiple event planning may be implemented in accordance with an embodiment.

Turning now to FIG. 5, a system 500 upon which traffic impact prediction for multiple event planning may be implemented in an embodiment will now be described. The system 500 includes a host system computer 502 and communication devices 504 communicatively coupled to one or more network(s) 506. The host system computer 502 may be implemented as one or more high-speed computer processing devices, such as one or more mainframe computers or servers capable of handling a high volume of computing activities conducted by end users of the social interaction facilitation tool. The host system computer 502 may operate as a database server and coordinate access to application data including data stored on a storage device 510. The storage device 510 may be implemented using memory contained in the host system computer 502 or may be a separate physical device. In an embodiment, the storage device 510 stores data associated with the multi-level framework for traffic planning, such as data associated with the ODE block 102, RR block 104, and ETA block 106 shown in FIG. 1.

The host system computer 502 may be implemented using one or more servers operating in response to a computer program stored in a storage medium accessible by the server. The host system computer 502 may also operate as a network server (e.g., a web server) to communicate with the communications devices 504, as well as any other network entities. In an embodiment, the host system computer 502 may represent a node in a cloud computing environment or may be configured to operate in a client/server architecture.

The communications devices 504 may be any type of devices with computer processing capabilities. For example, the communications devices 504 may include a combination of general-purpose computers (e.g., desktop, lap top), host-attached terminals (e.g., thin clients), and portable communication devices (e.g., smart phones, personal digital assistants, and tablet PCs). The communications devices 504 may be wired or wireless devices. In an embodiment, the communications devices 504 may represent cloud consumers in a cloud computing environment.

In an embodiment, the communications devices 504 may be implemented by end users of a website or web service hosted by an entity or enterprise operating the host system computer 502. The communications devices 504 may each execute a web browser for accessing network entities, such as the host system computer 502. In an embodiment, the communications devices 504 access a web site of the host system computer 502 for browsing and accessing an application 512. The application 512 implements the TPO tool and any other processes described herein.

The network(s) 506 may be any type of known networks including, but not limited to, a wide area network (WAN), a local area network (LAN), a global network (e.g. Internet), a virtual private network (VPN), and an intranet. The network(s) 506 may be implemented using a wireless network or any kind of physical network implementation known in the art, e.g., using cellular, satellite, and/or terrestrial network technologies.

The system 500 also includes storage devices 508 communicatively coupled to the host system computer 502. The storage devices 508 may be logically addressable as consolidated data sources across a distributed environment that includes a network (e.g., network(s) 506). The storage devices 508 can store, along with or in place of storage device 510, data associated with the multi-level framework for traffic planning.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium (s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method of traffic impact prediction, the method comprising:

estimating a link level background traffic demand in a transportation network, the estimating the link level background traffic demand including:

receiving information about available routes in the transportation network;

receiving expected background traffic volumes between origins and destinations in the transportation network; and applying a background traffic flow model that optimizes a background flow of the expected background traffic volumes among the available routes to minimize a sum of background congestion costs, background path entropy, and errors between an observed background traffic flow and the optimized background flow;

identifying alternative routes for at least a subset of the estimated link level background traffic demand, the identifying based on the available routes in the transportation network and event based control plans;

receiving expected additional event based traffic volumes between the origins and the destinations in the transportation network;

estimating a link level total traffic demand in the transportation network based on the expected additional event based traffic volumes, the identified alternative routes, and the estimated link level background traffic demand; and setting signal cycles of traffic signals in the transportation network based on the estimated link level total traffic demand.

2. The method of claim 1, wherein the observed background traffic flow is received from a subject matter expert (SME).

3. The method of claim 1, wherein the event based control plans include at least one of a variable message sign (VMS), a road closure, a turn restriction, and a detour.

4. The method of claim 1, wherein the identifying alternative routes includes event influenced estimated background traffic being assigned the identified alternative routes based on responsive rerouting.

5. The method of claim 4, wherein input to the responsive rerouting includes input from a SME.

6. The method of claim 1, wherein estimating the link level total traffic demand includes applying a total traffic demand model that optimizes a total flow of the expected background traffic volumes and the expected additional event based traffic volumes among the available routes and the identified alternative routes to minimize a sum of total congestion costs and total path entropy.

7. The method of claim 6, wherein the link level total traffic demand model further minimizes a deviation from the optimized background flow.

8. The method of claim 6 wherein the link level total traffic demand model further minimizes a deviation between observed turning ratios and estimated turning ratios.

9. The method of claim 8, wherein the observed turning ratios are received from a SME.

10. The method of claim 6, wherein the total traffic demand model takes into account spatial-temporal data that is estimated based on a total number of expected event attendees, an event start time, an event end time, and a location and capacity of at least one event parking lot.

11. A computer program product for traffic impact prediction, the computer program product comprising:

a tangible non-transitory computer readable storage medium having program code embodied therewith, the program code executable by a computer to implement:

estimating a link level background traffic demand in a transportation network, the estimating the link level background traffic demand including:

receiving information about available routes in the transportation network;

receiving expected background traffic volumes between origins and destinations in the transportation network; and applying a background traffic flow model that optimizes a background flow of the expected background traffic volumes among the available routes to minimize a sum of background congestion costs, background path entropy, and errors between an observed background traffic flow and the optimized background flow;

identifying alternative routes for at least a subset of the estimated link level background traffic demand, the identifying based on the available routes in the transportation network and event based control plans;

receiving expected additional event based traffic volumes between the origins and the destinations in the transportation network;

estimating a link level total traffic demand in the transportation network based on the expected additional event based traffic volumes, the identified alternative routes, and the estimated link level background traffic demand; and setting signal cycles of traffic signals in the transportation network based on the estimated link level total traffic demand.

12. The computer program product of claim 11, wherein the observed background traffic flow is received from a subject matter expert (SME).

13. The computer program product of claim 11, wherein the identifying alternative routes includes event influenced estimated background traffic being assigned the identified alternative routes based on responsive rerouting that includes input from a SME.

14. The computer program product of claim 11, wherein estimating the link level total traffic demand includes applying a total traffic demand model that optimizes a total flow of the expected background traffic volumes and the expected additional event based traffic volumes among the available routes and the identified alternative routes to minimize a sum of total congestion costs, total path entropy, and a deviation from the optimized background flow.

15. The computer program product of claim 14, wherein the total traffic demand model takes into account spatial-temporal data that is estimated based on a total number of expected event attendees, an event start time, an event end time, and a location and capacity of at least one event parking lot.

* * * * *